June 19, 1962 P. L. DESCHENES ET AL 3,039,176
AUTOMATIC WORK PERFORMING METHODS AND APPARATUS
Filed Nov. 13, 1957 6 Sheets-Sheet 1
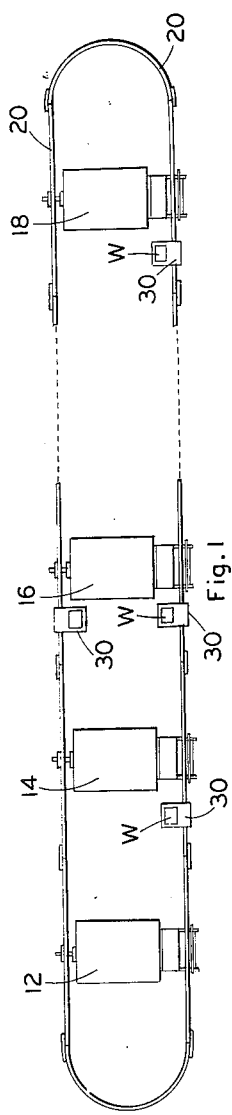
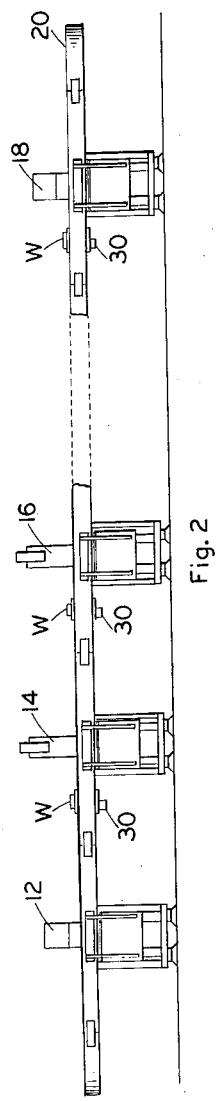
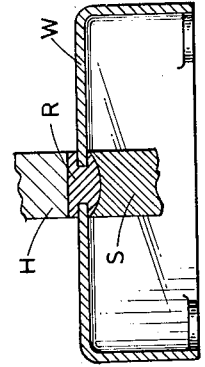
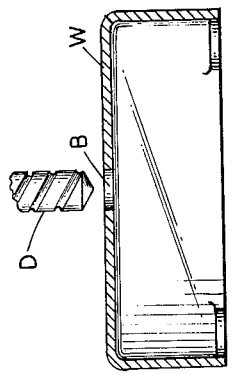
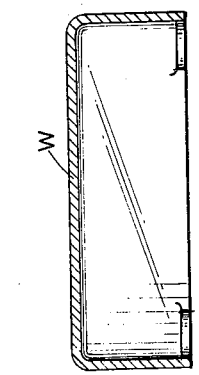
Inventors:
Paul L. Deschenes
Harry C. Royce, Jr.
by Richard E. Hesley
Their Attorney

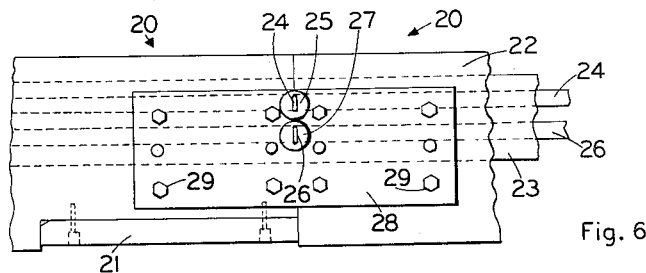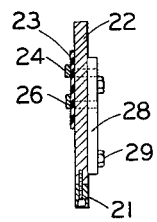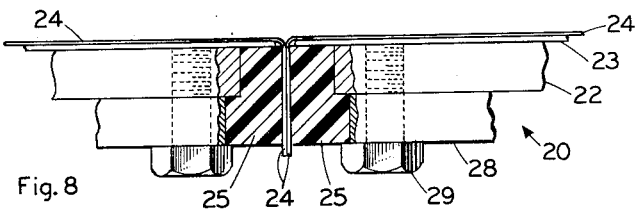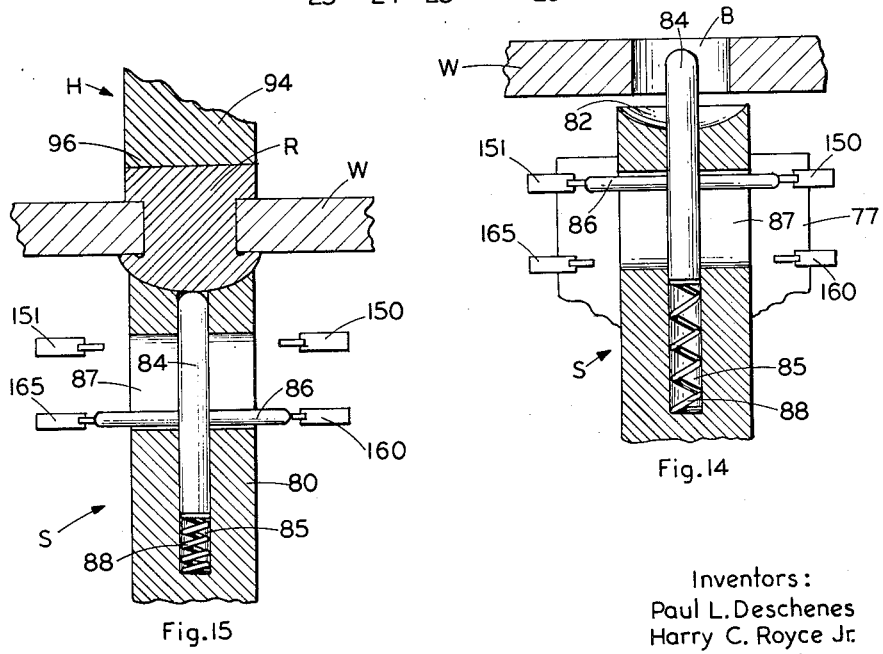

June 19, 1962   P. L. DESCHENES ET AL   3,039,176
AUTOMATIC WORK PERFORMING METHODS AND APPARATUS
Filed Nov. 13, 1957   6 Sheets-Sheet 3

Inventors:
Paul L. Deschenes
Harry C. Royce, Jr.
by Richard E. Hosley
Their Attorney June 19, 1962 P. L. DESCHENES ET AL 3,039,176
AUTOMATIC WORK PERFORMING METHODS AND APPARATUS
Filed Nov. 13, 1957 6 Sheets-Sheet 4

Inventors:
Paul L. Deschenes
Harry C. Royce, Jr.
by Richard E. Hosley
Their Attorney Inventors:
Paul L. Deschenes
Harry C. Royce Jr.
by Richard E. Hosley
Their Attorney Inventors:
Paul L. Deschenes
Harry C. Royce, Jr.
by *Richard E. Horley*
Their Attorney 3,039,176
AUTOMATIC WORK PERFORMING METHODS
AND APPARATUS
Paul L. Deschenes, Dover, and Harry C. Royce, Jr., Rollinsford, N.H., assignors to General Electric Company, a corporation of New York
Filed Nov. 13, 1957, Ser. No. 696,192
10 Claims. (Cl. 29—33)

This invention relates to the field of automation and more particularly to a novel automatic work performing method and apparatus especially adapted for performing work as by cutting or assembling a workpiece and its components in a series of successive operations.

Automatic production machinery is known whereby workpieces have work performed on them at a series of work stations, for example, by presenting to said work stations in properly timed relationship a series of workpieces supported on a rotary carrier which moves stepwise to advance the series of workpieces from station to station. Heretofore, however, such machines, particularly in cases in which many separate operations have to be performed, presented difficult problems, especially in regard to reliability and lack of flexibility, primarily because of their complex nature due to the necessary interrelation and design of their various parts for operation on a specific workpiece.

As for reliability, since the entire machine had to be shut down upon failure of a component, it was most difficult to design and build a suitably reliable machine, and this was particularly so when tool wear or the like was a factor. Hence, under many circumstances, it was considered impossible to build a completely automatic machine of acceptable reliability and the more conventional and expensive manual techniques had to be resorted to.

As for flexibility, unless the workpiece was to be manufactured in extremely large quantities at a high production rate, the heretofore known types of automatic production machines were not practical. This was because of the complete lack of flexibility of such machines, in that they could not readily be altered to conform with design changes in the workpiece, or for different types of generally related workpieces.

It is an object of the present invention to provide novel automatic assembly methods and apparatus wherein a series of operations are performed at different spaced stations by independent work performing mechanisms, and wherein a succession of workpieces are each presented sequentially to the stations at said mechanisms, but wherein the transfer means for advancing each of the workpieces from station to station are unsynchronized and operate independently of one another so that the advance of each workpiece through the overall system is controlled timewise only by the completion of an operation at one station, the availability of the mechanism at the next station, and the time required for advance of each individual workpiece on its individual transfer means between the mechanisms.

It is another object of the invention to provide novel work performing mechanisms for carrying out the functional requirements of an overall system, each of said mechanisms being actuated to perform its cycle of operation by the advance of a transfer means with its workpiece thereto and thereafter to release said workpiece.

It is a further object of the invention to provide novel transfer means for transferring individual workpieces sequentially along a series of work performing mechanisms.

It is a particular feature of the apparatus and methods of the invention that reliability is much less serious a problem than with heretofore known apparatus, because of the utilization of independently operable elements as building blocks of the overall system, and for the same reasons, such apparatus and methods are readily altered for design and other changes so that a highly flexible arrangement is provided. Nevertheless, the methods and machines of the invention are capable of undertaking the most complex of work and assembly operations and of performing them completely automatically.

These objects and features are accomplished according to the present invention by providing a plurality of automatic work performing mechanisms or stations, capable of operating completely independently of and unsynchronized with one another on successive workpieces each presented sequentially to each mechanism in a series by individual unsynchronized transfer means such as a powered car, preferably movable along a track extending along the series of mechanisms. According to the invention, the arrival of such a car with a workpiece at a work performing mechanism or station itself actuates the work performing cycle of the mechanism, such car with its workpiece being retained by the mechanism during its operating cycle and thereafter being released for movement to a succeeding work performing mechanism. Preferably since the car and its track may not provide sufficiently accurate alinement for certain operations, alinement means are provided on the mechanism itself so that the workpiece can be alined with any desired accuracy. Also, if desired, means are provided at a work performing mechanism for inspecting for the completion of the operation performed by it or by the preceding mechanism, both to avoid machine damage and to enable the car either to be moved through the mechanism without the necessity of its going through its complete cycle of operation, or to be stopped in that mechanism until the difficulty is remedied.

As for the track and car system forming the interconnecting links for carrying workpieces between successive work performing mechanisms, the track itself is preferably endless and may include switches and the like, and the cars movable therealong are preferably self-powered to move independently of one another along the track, stopping at each successive work performing mechanism for the time necessary to carry out its operating cycle, as determined by the mechanism itself. Too, as an additional aid to flexibility, the cars may be provided with a removable jig or other support for specific workpieces. With complex systems, switches and branch tracks may also be employed, so that, for example, cars may be fed alternatively from a main track to two mechanisms in parallel with one another, or from a plurality of branch tracks to a main track.

By the use of the methods and apparatus of the present invention, a completely automatic work performing system may be provided by assembling a plurality of generally similar work performing mechanisms in the desired sequence with a suitable interconnecting track and cars carried thereby, the cars being provided with a suitable jig for the specific workpiece and each work performing mechanism being set up to perform a desired operation. With such a system utilizing independent automatic work performing mechanisms actuated only by the arrival of a car to perform the operating cycle and then release the car, varying types of work performing mechanisms may be quickly and easily assembled to provide a desired overall sequence of operations, and may be as quickly and easily reassembled, rearranged, added to, or subtracted from, to accommodate design changes. Furthermore, reliability is much less of a problem, since breakdown of a single work performing mechanism does not affect the others and is readily located so that it may be substituted or its operation carried out manually without affecting the remainder of the operations. Similarly, upon breakdown of a car, such car need only be removed from the track, and its removal does not affect the remainder of the system.

For the purpose of explaining further objects and features of the invention, reference is now made to the following description of preferred embodiments thereof together with the accompanying drawings, wherein:

FIGS. 1 and 2 are, respectively, plan and elevational views of the apparatus of the invention;

FIGS. 3–5 are diagrammatic cross-sectional views showing a workpiece in various stages of the overall operation carried out by the apparatus of FIGS. 1 and 2;

FIGS. 6–8 are, respectively, elevational, cross-sectional and detail views of the interconnecting track of the apparatus of FIGS. 1 and 2;

FIGS. 14 and 15 are detail views of a portion of the mechanism of FIGS. 12 and 13 showing successive steps in its operation;

Figure 9:
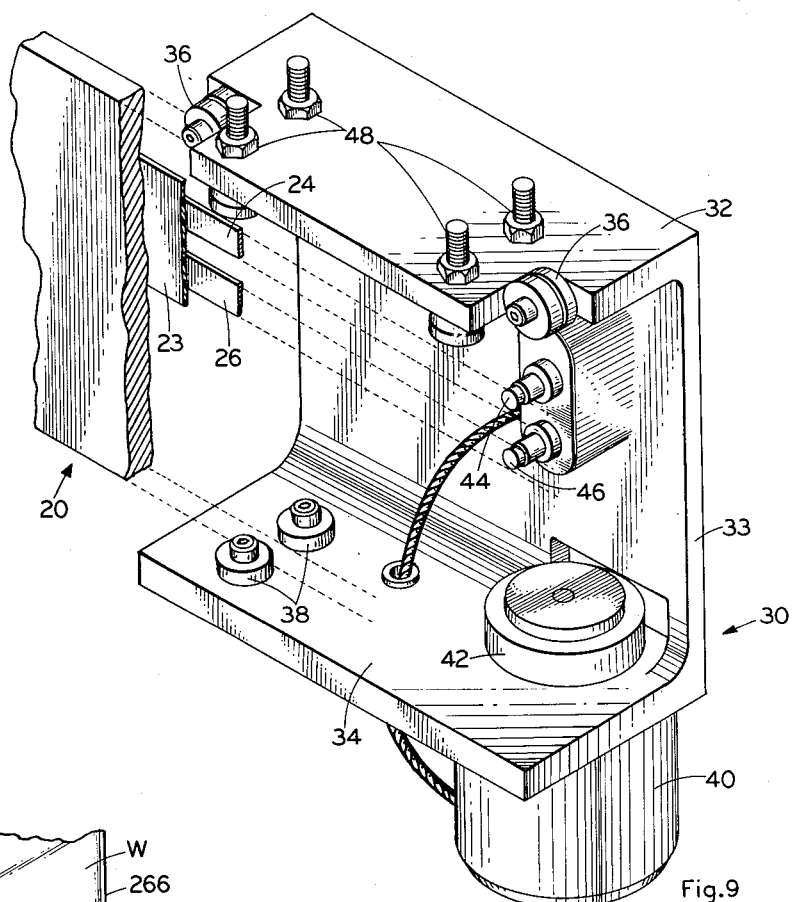
FIG. 9 is an isometric view of a car of the apparatus of FIGS. 1 and 2 shown with the track partially broken away.

Referring first to FIGS. 1 and 2, a preferred apparatus according to the present invention includes a plurality of individual work performing mechanisms generally designated 12, 14, 16 and 18. Such mechanisms are all interconnected by a common endless track, generally designated 20, with a plurality of identical cars, generally designated 30, each independently movable along said track and adapted to carry a workpiece W. With such a system, mechanism 12 may provide a workpiece input station operating to position an unassembled workpiece W on each car 30 and mechanism 18 may provide an ejection station to remove an assembled workpiece W from each car, with mechanisms 14 and 16 therebetween performing work such as cutting and assembly operations on each workpiece W, all as hereinafter more fully explained.

Figure 10:
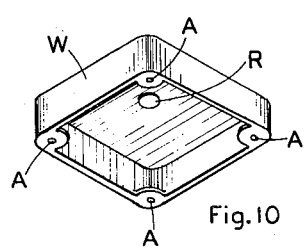
FIG. 10 is an isometric bottom view of the workpiece of FIGS. 3–5.

However, as an introduction to a detailed explanation of the overall system of the invention and as an aid to its understanding, consider that a specific workpiece W of general open-sided, box-like configuration, shown in FIG. 3, is to undergo the complete cycle of operation. Accordingly, such a workpiece W is fed onto a car 30 by mechanism 12; next, after being carried to mechanism 14 by said car, has a bore B drilled in its bottom by drill D, as shown in FIG. 4, and then is released from mechanism 14. Car 30 then carries it to mechanism 16 where it has a rivet R inserted and staked in the bore B by tools such as hammer H and stake S, as shown in FIG. 5. Finally, car 30 carries the completed workpiece to mechanism 18 where it is ejected in its completed form as shown in FIG. 10. Such an overall operation, though simpler than would ordinarily be the case, will serve adequately to explain the principles of the present invention, especially in view of the unique use of a series of spaced, independent work performing mechanisms which can be assembled with track and cars to make up any overall work performing operation, including both cutting and assembly steps, however complicated.

Each of the work performing mechanisms herein shown at 12, 14, 16 and 18 are generally similar in that they are each constructed and arranged automatically to perform a cutting or assembly operation on a workpiece W whenever actuated by the presence of a car 30 or a workpiece W carried thereby, or both, although the work or assembly portion of their operation cycle necessarily differs somewhat from mechanism to mechanism. Accordingly, because of their general similarity, but a single one of such mechanisms will be shown and described in complete detail, the structure and operation of the remaining mechanisms being described largely by reference thereto. As the specific mechanism to be described, work performing mechanism 16 will be selected, since it not only has the most complicated cycle of operation, but since such cycle includes the types of steps which must be carried out in the other mechanisms. However, as a prelude to the description of work performing mechanism 16, an understanding of the arrangement of track 20 and cars 30 will be helpful since they constitute the link common to the entire system and are essential in the provision of apparatus according to the present invention.

Turning to FIGS. 6, 7 and 8, the track 20 is made up in sections, each preferably mounted on a mechanism 12, 14, 16 and 18 and extending therebeyond as hereinafter more fully described. Such sections are identical except for being curved or straight as required and include a face plate 22, with an insulated strip 23 on the rear surface thereof, having attached thereto two flat conductors 24 and 26. In order to provide means for quickly and easily assembling the track sections to one another, insulated end pieces 25 and 27 are provided at the ends of conductors 24 and 26, respectively, as well as a junction plate 28 extending along each of sections 22 and beyond the end thereof, with said junction plate being attached to face plate 22 by suitable bolts 29. Thus, to assemble the track sections, the ends of conductors 24 and 26 are bent around the ends of their respective insulated end pieces 25 and 27 and the track sections are moved together until adjacent condutors as bent around their end pieces are in contacting face-to-face relationship. The junction plate 28 may then be mounted to the abutting ends of the track sections, and a suitable source of electric power may be connected to the abutting conductors 24 and 26 protruding outwardly beyond junction plate 28. Also, preferably, a removable lower edge portion 21 is provided at at least one end of each track section for car removal as such is necessary.

One of the cars 30 which operates along track 20 is shown in FIG. 9, with a portion of said track also being shown partially broken away and indicated in dashed lines to show the mounting of said car on the track. Such car includes a generaly rectangular C shaped frame with an upper flange 32 and a lower flange 34 connected by a web 33 with the various operating components thereof mounted thereon. Thus, the frame is supported for movement along track 20 by a pair of grooved rollers 36 mounted for rotation about horizontal axes at the ends of upper flange 32 in a position to engage the upper edge of track face plate 22. Alinement is provided by a pair of rollers 38 mounted for rotation about vertical axes to engage the opposite sides of plate 22 adjacent the lower edge thereof. Removal of car 30 from the track is readily accomplished by the removal of the lower edge portion 21 of face plate 22 thereof, so that rollers 38 are released to permit the car 30 to be swung sideways and lifted from the track.

For driving the car, an electric motor 40 is mounted beneath lower web 34 with its shaft extending vertically upwardly therethrough and having a rubber-surfaced driving wheel 42 mounted thereon above lower flange 34 in a position to contact a vertical surface of track face plate 22. Rack and gear drive may also be used. Suitable power is supplied to motor 40 by brushes 44 and 46 mounted on web 33 in a position to contact conductors 24 and 26, respectively, on track face plate 22. Preferably, motor 40 is of the stalling type, that is, able to remain in non-rotating state without overheating, so that a car 30 can be maintained in stationary position simply by blocking its passage, but electrical switching arrangements either applied directly to the motor circuit or to a track section, could also be used to achieve the necessary car control.

Figure 11:
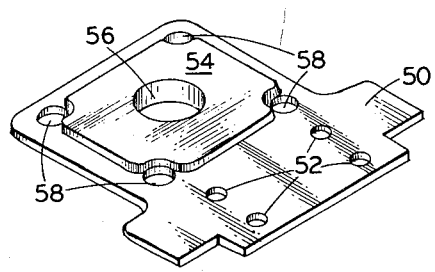
FIG. 11 is an isometric top view of a jig for removable mounting on the car of FIG. 9 to support the specific workpiece of FIG. 10 thereon.

In order that cars 30 may be universal in their use, a plurality of upstanding studs 48 are provided on upper flange 32 for receiving a jig or support plate 50 (FIG. 11) adapted to support the specific workpiece W in view both of its configuration and the sequence of operations to be performed on it during its movement through the apparatus of the invention. Accordingly, support plate 50, in addition to holes 52 for receiving car studs 48, includes a centering plate 54 adapted to receive the lower open end of workpiece W. Also, to permit the performance of the required operations, a central hole 56 is provided through plates 50 and 54 for access of a staking tool S to the workpiece W and four peripheral holes 58 are provided beneath the corners of workpiece W for access of alinement pins to the alinement recesses A of said workpiece.

Returning to the structure and operation of the specific work performing mechanism to be described as typical, mechanism 16 is shown in detail in FIGS. 12 through 16. In general, such mechanism includes a frame 60 having its various operating components mounted thereon, said frame also having a track supporting arm 62 supporting track 20 by means of suitable bolts 64 passing through its face plate 22 and a feed trough 98 having an escapement 66 for presenting rivets R to be assembled with workpiece W.

With this specific mechanism, the major working components are two in number and have, respectively, a workpiece support and alinement function and an assembly function. The first of these components includes a hydraulic cylinder 70 mounted on frame 60 in a position beneath workpiece W and support plate 50 of a car 30 in position in mechanism 16. Such cylinder has a piston 72 mounted therein for reciprocating movement in a vertical direction in accordance with fluid pressure selectively applied to opposite ends of said cylinder through lines 73 and 75. Piston 72 at its upper end has mounted thereon, preferably in a removable manner, a horizontal plate 76, said plate having in turn mounted thereon four upstanding alining pins 78 constructed and arranged to extend upwardly through holes 58 in plates 50 and 54 of the workpiece supporting means of a car 30 (FIG. 11) to engage the alinement recesses A of the workpiece W (FIG. 10). Also, a tool, generally designated S, in the form of an upstanding cylindrical member 80, is mounted on said plate 76, said tool having a working face 82 of concave shape to act as a staking element for a rivet R. In addition, as best shown in FIGS. 14 and 15, a plunger 84 is mounted in a central bore 85 of said tool, said plunger having a cross member 86 extending laterally outwardly through an elongated slot 87 in member 80 and being normally pressed upwardly by a spring 88 in the bottom of bore 85. As hereinafter more fully explained, switches 150, 151, 160 and 165 are positioned on a suitable support member 77 on plate 76 to be engaged by cross member 86, switches 150 and 151 being actuated when said cross member is in its normal upper position and switches 160 and 165 being actuated when said cross member is in its lower position. Additionally, piston 72, beneath plate 76, has a transverse switch engaging arm 74 for engaging, when piston 72 is in its lower position, a "support piston down" switch 174 and when the piston is in its upper position, a "support piston up" switch 140, both mounted on frame 60.

The second of the major working components includes a hydraulic cylinder 90 mounted on frame 60 in a position above workpiece W and the end of trough 66. Such cylinder has a piston 92 mounted therein for reciprocating movement in a vertical direction in accordance with fluid pressure selectively applied to opposite ends of said cylinder through lines 93 and 95. Piston 92 at its lower end has mounted thereon, preferably removably, an assembly tool generally designated H, in the form of a cylindrical member 94 having a flat working end 96 for removing in a downward direction a rivet R maintained in escapement 66 at the end of a feeding chute 98 having its end suitably adjacent the path of travel of working end 96. Additionally, piston 92, at its upper end, has a transverse switch engaging arm 91 for engaging, when piston 92 is in its upper position, a switch 172, when the switch is in its overshoot position, a switch 163, and when the piston is in an intermediate position, actuating a normally open time delay switch 165 which is deenergized by upward movement of piston 92 without closing if such occur within a specified time.

Figure 16:
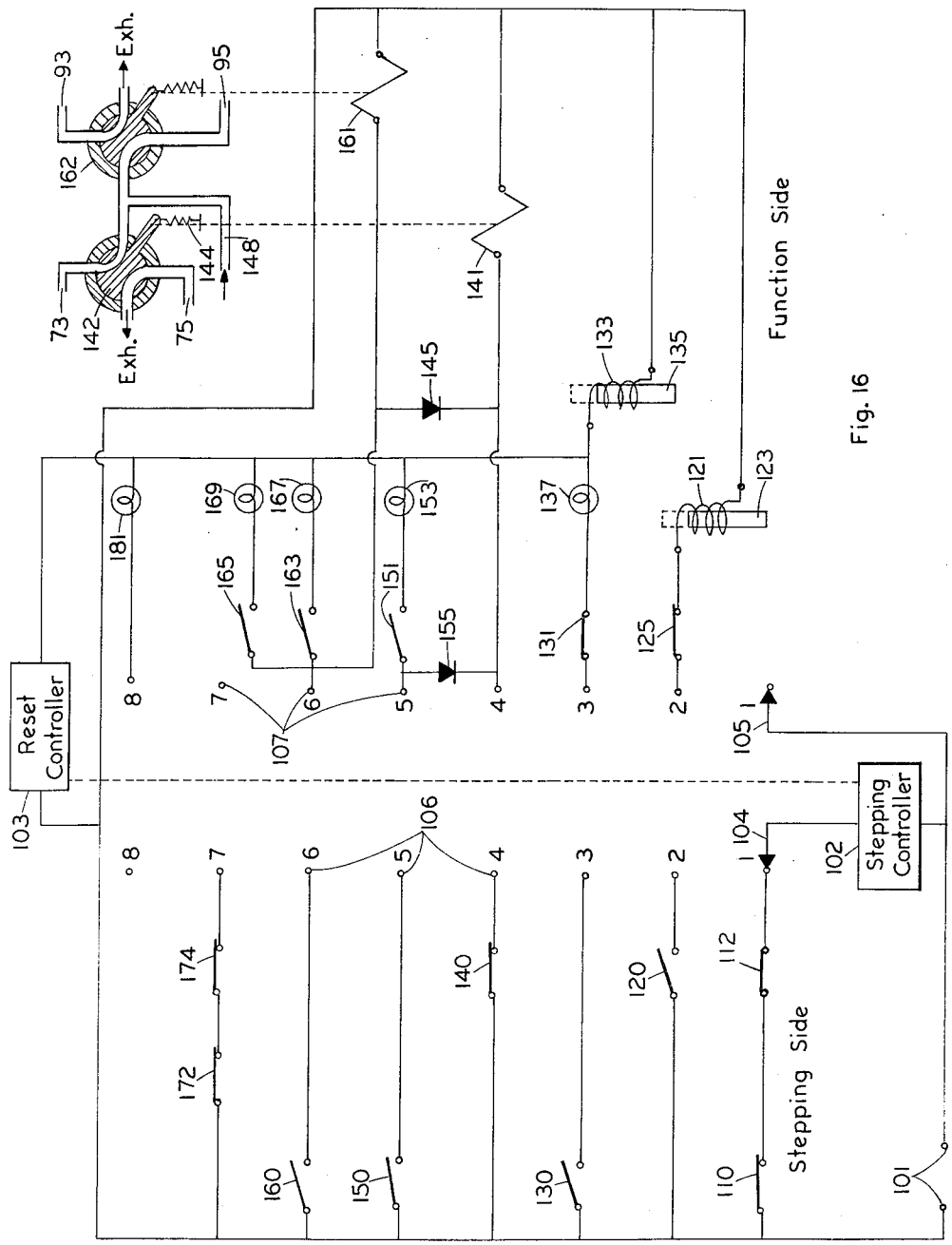
FIG. 16 is a circuit diagram of the mechanism of FIGS. 12–15.

The control circuit for operating mechanism 16 is shown in FIG. 16, with the functional positions of the elements being shown in FIGS. 12–15 as appropriate. Referring first to FIG. 16, the heart of the control circuit is a stepping switch of the homing type having two decks with eight terminals, 106 and 107, and cooperating contactors 104 and 105 operated together either by a stepping controller 102 to advance said contactor or by reset controller 103 to home said contactors to their "1" terminals. To aid in understanding, the deck of said stepping switch that controls stepping controller 102 by connecting it through its contactor 104 and one of its terminals 106 to a source of electric power at terminals 101 will be referred to herein as the stepping side of said switch, while the other deck will be referred to as the function side.

Thus, on the stepping side of the switch, its "1" terminal is connected in series with a normally open "car in ready station" switch 110 and a normally closed "no car in work station" switch 112, the ready station and the work station being defined respectively by a ready station stop pin 123 and a work station stop pin 135 each mounted with its coil 121 or 133 on frame arm 62. Thus, the work station stop pin 135 is positioned so as to engage the leading end of a car 30 to maintain it in a generally alined position with regard to the operating components of work performing mechanism 16, while the ready station stop pin 123 is positioned to engage car 30 and maintain it in a position reasonably close to but just clear of the work station. Switch 110 is accordingly mounted on frame arm 62 in a position to engage a car 30 in the ready station and switch 112 in a position to engage a car 30 in the work station.

The "2" terminal 106 of the stepping switch is connected in series with normally open "car in work station" switch 120 mounted on frame 60 in a position to engage a car 30 in the work station, while the "3" terminal 106 is connected in series with normally open "workpiece present" switch 130 mounted on frame 60 in a position to engage a workpiece W on a car 30 in the work station. The "4" terminal, "5" terminal and "6" terminal are, respectively, in series with normaly open "support piston up" switch 140, normally closed "bore present" switch 150 and normally open "rivet present" switch 160, while the "7" terminal is in series with both the normally open "support piston down" switch 174 and the normally open "assembly piston up" switch 172. The "8" terminal 106 is unconnected.

On the function side of the stepping switch, "1" terminal 107 is unconnected, and "2" terminal is in series with normally closed "car leaving ready station" switch 125 and the coil 121 of the ready station stop pin, said switch 125 being mounted on frame arm 62 in a position such that it is opened by a car leaving the ready station but not by a car in the work station. "3" terminal 107 is connected in series with normally closed "workpiece present" switch 131 mounted similarly to associated switch 130 to energize yellow light 137, work station stop pin coil 133 and reset controller 103 upon closing of said switch. The "4" terminal 107 is connected in series with the coil 141 of four-way valve 142 arranged to supply fluid under pressure from a suitable source 148 to one of the lines 73 and 75 of support piston cylinder 70. Normally, as shown, a spring 144 maintains valve 142 in a position whereby line 73 is connected to pressure source 148 and line 75 is connected to exhaust, so that piston 72 is maintained in down position. The "5" terminal 107, in addition to being connected to coil 141 through rectifier 155 to maintain it in energized condition, is connected in series with normally open "bore present" switch 151 and orange light 153 and both of work station stop pin coil 133 and reset controller 103. The "6" terminal 107 has three series connections, a first through the coil 161 of a fourway valve 162 arranged similarly to valve 142 to supply fluid under pressure to one of lines 93 and 95 of cylinder 90 and also to coil 141 through rectifier 145, a second through normally open "assembly piston overshoot" switch 163 and its blue light 167 to the work station stop pin coil 133 and the reset controller 103, and a third through normally open time delay switch 165 and its red light 169 and also to coil 133 and reset controller 103. The "7" terminal 107 has no connection and the "8" terminal is connected through its green light 181 to the reset controller 103 and work station stop pin coil 133.

Figures 12, 18:
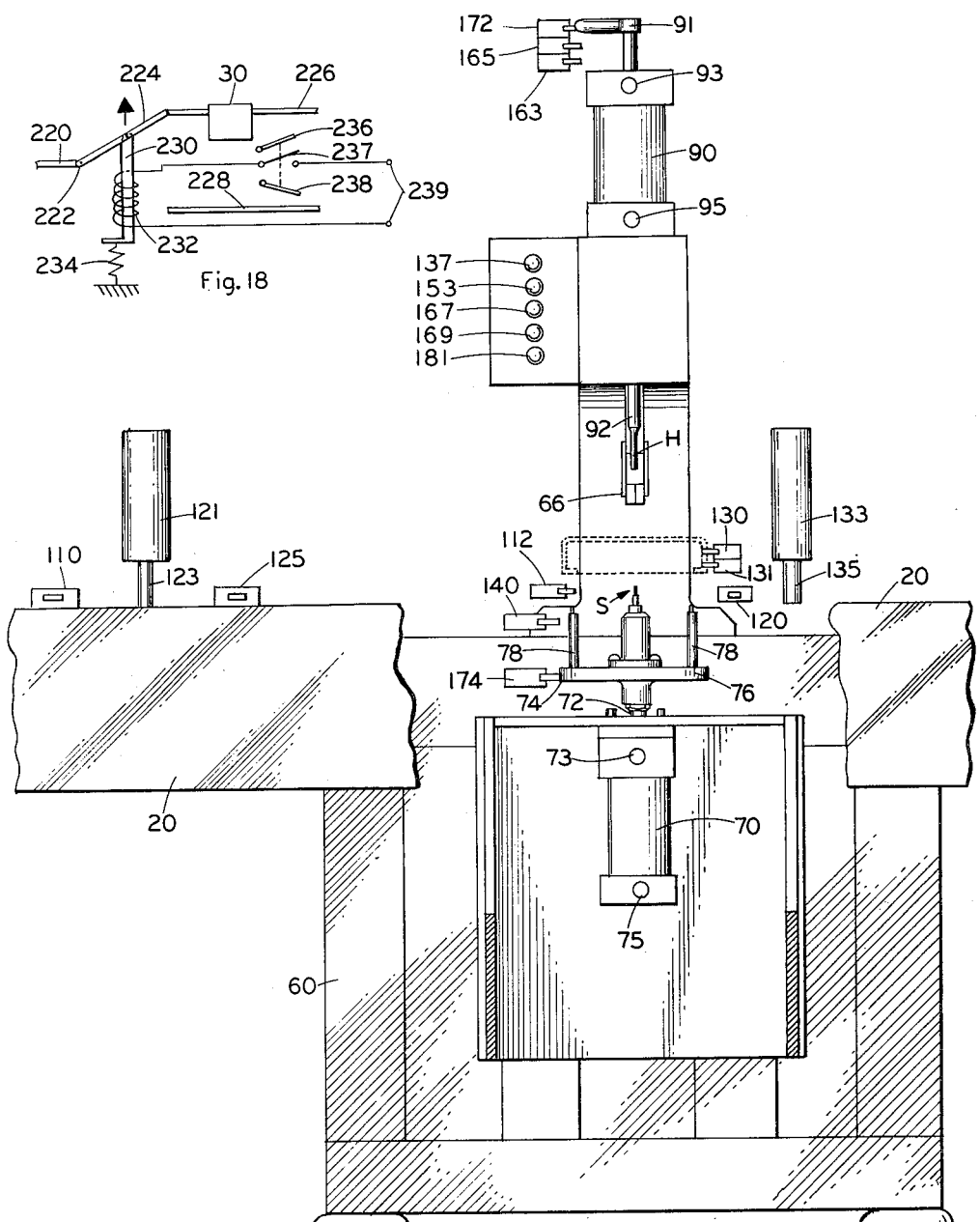
FIG. 12 is a front elevational view, partly broken away, of a work performing mechanism of the invention.
FIG. 18 is a plan view of a switch means useful with the track of FIGS. 6–8.

As to the warning lights 137, 153, 167, 169 and 181, as shown in FIG. 12 mounted in a group on frame 60 of mechanism 16, it is contemplated that somewhat more elegant warning systems, including, if desired, audible warning systems and remote installations of both visual and audible elements may be employed, and such may readily be provided for by installing suitable relays in series with or in substitution for said lights. Also, although the circuit herein described is arranged to permit the passage through a mechanism of defective workpieces, it may readily be altered so that the mechanism be stopped on such occurrence, this being accomplished by providing manual operation of reset and stop pin release rather than automatic in the event of the discovery of a defective workpiece by the inspection elements of the mechanism.

Before undertaking any description of further aspects of the system of the invention, particularly as to details of further work performing mechanisms, a complete cycle of operation of mechanism 16 as above described will be helpful, including both its normal operation and its operation in case of errors in the operation, either at a preceding station or the station at mechanism 16 which result in the production of a defective workpiece. Thus, assume that the stepping switch is reset and that the work station at work performing mechanism 16 is clear and ready to receive a workpiece carrying car 30 which is retained in said ready station by ready station stop pin 123 (normally down). All switches and other controls are shown in the above expressed condition.

With stepping switch contactors 104 and 105 reset at their "1" terminals 106 and 107, on the stepping side of said switch, normally open "car in ready station" switch 110 will be closed and normally closed "no car in work station" switch 112 closed Thus, with the closing of all of the switches in series with "1" terminals 106 of contactor 104, stepping switch stepping controller 102 is energized to step contactors 104 and 105 to their "2" terminals 106 and 107 respectively.

At the "2" terminals 106 and 107, on the function side of said switch at "2" terminal 107, the ready station stop pin 123 is energized through its coil 121 to move it up to realese car 30. As soon as car 30 passes into the work station, "car leaving ready station" normally closed switch 125 opens to de-energize ready station stop pin coil 121 so that the stop pin 123 returns to its down position to block any following car 30 and keep it in the ready station. On the stepping side, with stepping switch contatcor 104 at its "2" position on terminals 106 and car 30 in the work station against work station stop pin 135, normally open "car in work station" switch 120 will be closed which will energize stepping controller 102 to step contactors 104 and 105 to the "3" terminals.

At the "3" position of terminals 106 and 107, on the function side of the switch at "3" terminal 107, if a workpiece W not be present on the car 30, normally open "workpiece present" switch 131 will close, energizing work station stop pin 135 through its coil 133 and stepping switch reset controller 103 to allow the car 30 to move from the work station. This saves the itme which would otherwise be necessary for the rest of the cycle and passes car 30 directly out of the work station. However, yellow indicator light 137 will also become illuminated to show an observer that the cycle was not a complete one. On the stepping side of the switch at "3" terminal 106, normally open "workpiece present" switch 130 closes and energizes stepping controller 102 to step contactors 104 and 105 to their "4" terminals 106 and 107.

At the "4" terminals, on the function side of the switch at "4" terminal 107, the work support cylinder 70 becomes energized through its coil 141 and valve 142 to move its piston 72 up to raise the workpiece W off the car 30 by engagement of alining pins 78 with workpiece recesses A and so aline the workpiece for the insertion of rivet R in the previously drilled bore B. Rectifier 145 at the same time prevents energization of coil 161, and rectifier 155 energization of the reset controller and stop pin coil through switch 151. On the stepping side at "4" terminal 106, the closing of "support piston up" switch 140 energizes stepping controller 102 and steps contactors 104 and 105 to their "5" terminals 106 and 107 respectively.

At the "5" terminals 106 and 107, on the function side at "5" terminal 107, coil 141 remains energized through rectifier 155. In addition, referring now also to FIG. 14, if normally open "bore present" switch 151 as actuated by plunger 84 located in the nose of swaging tool S in a position to contact the bottom of workpiece W was closed because said plunger did not pass into the bore B when the work support piston 72 was raised, such switch becomes closed by engagement with workpiece W to open work station stop pin 135 by energizing its coil 133 and to enrgize reset controller 103. Orange warning light 153 also lights up to indicate the workpiece condition to an observer. This operation, then, acts as an inspection of the operation of the preceding automatic mechanisms 14, so that if its operation, i.e., drilling bore B, was not performed, the remainder of the cycle performed at mechanism 16 is skipped to avoid tool damage and to save time and also a warning of improper operation of the preceding mechanism is given.

On the stepping side at "5" terminal 106, if the normally closed "bore sensing" switch 150, also actuated by plunger 84, remains closed because of the presence of bore B, the stepping controller 102 is energized to step contacts 104 and 105 to their "6" terminals.

At the "6" terminals 106 and 107, on the function side at "6" terminal 107, the assembly piston 92, in addition to the work support piston 72, is energized through its coil 161 and valve 162 to move said piston downwardly so that the end surface 96 of its hammer H removes a rivet R from the escapement 66 at feed trough 98 and moves it downwardly through bore B so that such rivet is swaged or staked against face 82 of staking tool S beneath the hole. Referring now also to FIG. 15, if the operation is carried out as expected, staking tool plunger 84 is again depressed as rivet R moves against it and to close normally open "rivet present" switch 160 in series with the stepping side at "6" terminal 106. This steps the switch to "7" terminals 106 and 107, de-energizing work support piston and assembly piston coils 141 and 161 to retract the support and assembly pistons.

However, there are two other possibilities than the successful completion of this portion of the operation; first, the rivet R does not enter the bore B at all, either because no rivet is present in position at the escapement 66, or because it escapes when being moved into the bore; and second, that the rivet becomes jammed so that it does not seat itself with its flange against the upper face of the workpiece. In the first instance, the assembly piston 92 will overshoot and contact "overshoot" switch 163 in series with function terminals "6" to move the work station stop pin 135 through its coil 133 and energize the reset controller 103, moving car 30 out of the work station and also illuminating blue warning light 167. In the second instance, the assembly piston 92 will not complete its stroke within the usual interval of time and "assembly piston time delay" switch 165 in parallel with overshoot switch 163 will close after an interval of time so that stop pin coil 133 and reset controller 103 be energized to allow car 30 to move from the work station and reset the stepping switch, also illuminating red warning light 169. In either of these instances, no stepping occurs because "rivet present" switch 160 remains open. The interval of time prior to operation of time delay switch 165 is set for a sufficiently long time so that it does not close during normal operation, but rather stepping occurs.

At "7" terminals 106 and 107, assuming the stepping controller 102 to have been energized by the proper installation of rivet R, upon the retraction of the assembly and support pistons 92 and 72, "assembly piston up" switch 172 and "support piston down" switch 174 are closed to energize the stepping controller 102 to step the contactors 104 and 105 to terminals "8."

At the function side, at "8" terminal 107, reset controller 103 and work stop pin coil 133 are energized to retract work station stop pin 135 to allow the car 30 to move out of the station, and the reset controller 103 is operated to reset back to its "1" terminals the stepping switch for its next cycle of operation. Also, green "complete cycle" light 181 is illuminated.

The remaining work performing mechanisms of the overall system of the invention are generally similar to that above described. Thus, the mechanism 14 merely need be provided with a rotary drill D in place of hammer H and the mechanism including the circuitry left the same except for the elimination of certain elements such as bore and rivet sensing means and the addition of an overshoot switch to the stepping side in place of the "rivet present" switch. Likewise, the input and output mechanism may be modified by substituting a horizontal cylinder and piston means for the assembly cylinder and piston, as shown in FIG. 17, and such may also be used as a means for transferring a workpiece from a car on one track system to a car on another track system, as from a branch line to a main line.

Figure 17:
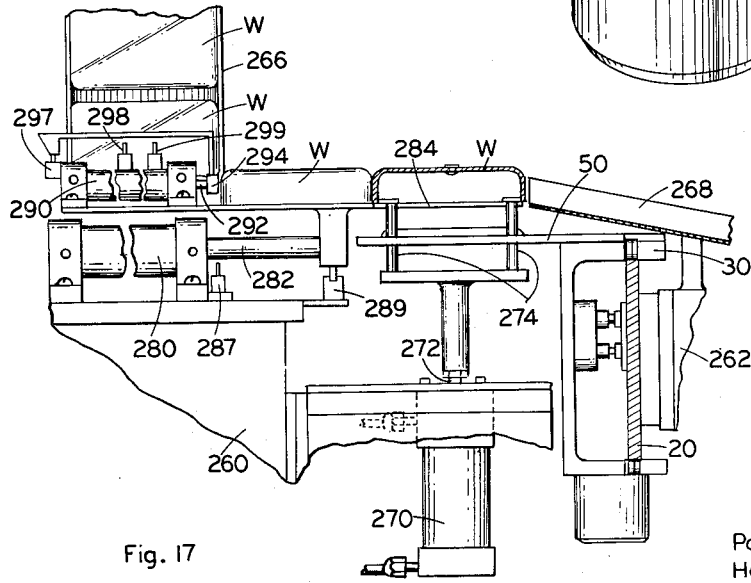
FIG. 17 is an isometric view, somewhat diagrammatic, of another work performing mechanism of the invention.
Figure 13:
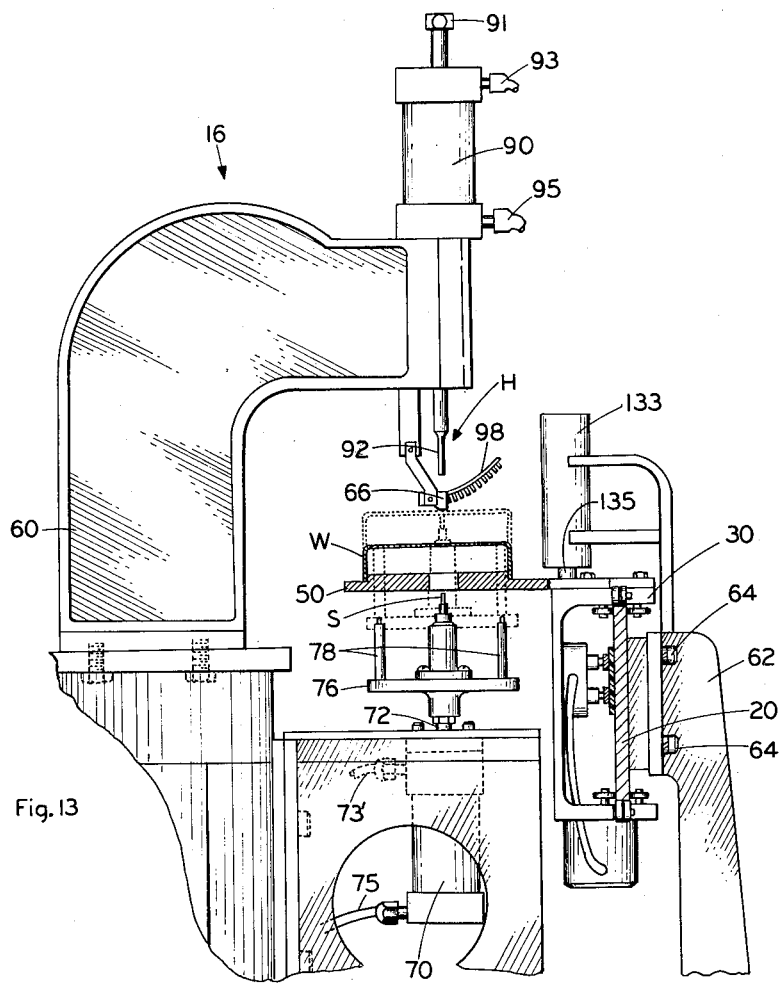
FIG. 13 is a partial side elevational view of the mechanism of FIG. 12.

Referring then to FIG. 17, the work performing mechanism there shown includes a frame 260 having a track supporting arm 262 carrying a section of track 20, as well as a support cylinder 270 having a vertically movable piston 272 constructed and arranged as described with reference to mechanism 16 except for the provision of flat-topped alinement pins 274 which are not received within workpiece holes A but rather support it for sliding movement thereon. As the work performing components, however, a pair of cylinders 280 and 290 are provided with horizontally movable pistons 282 and 292 which may, by changing the stroke of one of said pistons, be operated either to move workpieces W sideways from an input chute 266 onto an empty jig 50 on a car 30 in the work station of the mechanism to operate as input mechanism 12, or to move workpieces W from jig 50 into an output chute 268 to operate as ejection mechanism 18. Also, by the use of a pair of such mechanisms, connecting the output chute 268 of one to the input chute 266 of another as by a suitable conveyor belt (not shown) means are provided for moving a workpiece W from one track to another so that, for example, workpieces partially completed on one or more branch endless track systems may be transferred onto a main endless track system, and such transfer need not be onto jigs, but may, for example, be onto partially completed workpieces. Such an arrangement makes possible the preparation of one or more sub-assemblies on one or more branch tracks and the assembly on a main track of said sub-assemblies into a finished product.

Referring more specifically to FIG. 17, piston 282 is provided at its end with a flat conveyor plate 284 which can be advanced by said piston from a position beneath the end of input chute 266 in a direction transversely of track 20 to pass between support pins 274 of support piston 272 substantially in the plane of the flat top surface thereof and bridge between chutes 266 and 268. Piston 292 is provided at its end with a pusher plate 294 which can be advanced from a position clear of input chute 266 across the end of said chute just above conveyor plate 284 and toward output chute 268, the stroke of said piston being variable so that, for in input operation, such stroke terminates at a point wherein a workpiece W is positioned above pins 274 and, for an ejection operation, such stroke terminates at a point wherein a workpiece W is positioned in output chute 268.

The necessary switching elements are arranged generally similarly to those shown in FIG. 16, except that many of such elements associated with assembly piston 92 (FIG. 12) thereof are eliminated and instead suitable positioning switches are provided for operation of the pistons 282 and 292. Thus, "conveyor plate advanced" switch 289 and "conveyor plate retracted" switch 287 are mounted on frame 260 for actuation by piston 282, and "pusher retracted" switch 297, "pusher advanced (input)" switch 298 and "pusher advanced (reject)" switch 299 for actuation by piston 292, one or the other of the latter two switches being manually selected in accordance with the function to be performed.

The operation is similar to that already described with reference to mechanism 16 except that, during the time the support piston 272 remains in raised position, the conveyor plate piston 282 first advances until stopped by switch 289, then pusher plate piston 292 goes through its stroke as determined by one of switches 298 or 299. For input, conveyor plate piston 282 preferably retracts while pusher plate piston 292 maintains the workpiece in position to be received by the alinement pins 274, while for ejection it makes no difference which piston is first retracted.

If, for some reason, it be desired to utilize two work performing mechanisms in parallel, as to carry out a slow operation without affecting the speed of the system, switching means such as shown in FIG. 18 may be employed, whereby alternate cars 30 are automatically switched alternatively to the parallel tracks. As shown, a single track section 220 has pivotally mounted at its end for swinging movement about pivot 222, a swingable track portion 224 for connecting said track portion 220 selectively to one of parallel track sections 226 or 228. To provide the desired alternating switching function, a solenoid actuated switching arm 230 is arranged with a coil 232 and a compression spring 234 for maintaining said arm in its deenergized condition with swingable track portion 224 connecting single track section 220 to parallel track 226, and in its energized condition, with coil 232 connected by its switch 237 to a suitable source of power at terminals 239, with said swingable track portion connecting said section 220 to the other parallel track 228, switch 237 being alternately operated to open and close it by car actuated elements 236 and 238 connected thereto and positioned adjacent parallel track sections 226 and 228 respectively. Thus, in operation, a car 30, having passed from main track section 220 to one of the parallel track sections 226 or 228 actuates one of elements 236 and 238 to operate switch 237 and change swingable track portion 224 to its other position.

Similarly, switching may be accomplished from two parallel track sections to a single main track section, by the use of a pair of swingable track sections and by appropriately relocating the actuating elements for the switching means, or, alternatively, mechanisms such as are shown in FIG. 17 may be used to accomplish the desired function.

Also, if desired, either of these switching functions may be made a part of a work performing mechanism itself, as at its input or output, by alternately actuating suitable switches by the ready station or work station stop pins to shift the switching element itself.

Particularly when a complicated track system employing branch lines and parallel main lines, for example, be employed, it is not essential to the operation of the invention that a track be endless in the sense that the track itself form a loop, since other means, such as conveyor belts, elevators and the like, or combinations thereof, might be employed to return the cars from the end of an assembly line to the input thereof for receiving new workpieces, or such return might be accomplished periodically by any suitable means.

Thus, it will be seen that the invention provides novel and useful automatic work performing apparatus and methods. Various modifications thereof, within the spirit of the invention and the scope of the appended claims will be apparent to those skilled in this art.

We claim:

1. An automatic mechanism comprising a plurality of individual un-synchronized transfer means, each said transfer means being adapted to carry a work piece, track means guiding said plurality of transfer means, a plurality of operating stations along said track means, stop means for maintaining a transfer means in each of said plurality of operating stations sequentially for a predetermined operation, actuating means for each of said operating stations including resettable stepping switch means and a plurality of controlling switches including a transfer means sensing switch actuated by the presence of a transfer means in said operating station and an operation switch actuated by completion of said predetermined operation, said actuating means being operable by the presence in said operation station of a transfer means for initiating the said predetermined operation and release means operable by said actuating means following said predetermined operation to actuate said stop means for release of said transfer means from said operating station and to reset said resettable switch.

2. A mechanism as claimed in claim 1 in which means are provided in at least one of said operating stations for removing said work piece from said transfer means, said removing means operable by said actuating means by the presence of said transfer means in said operating station.

3. A mechanism as claimed in claim 1 wherein sensing means are provided for inspecting said workpiece, said sensing means being connected to said actuating means to release said stop means prior to the completion of said predetermined operation upon sensing a defect in said workpiece.

4. A mechanism as claimed in claim 1 further including ready station stop means mounted adjacent said track means in advance of said operating station for maintaining said transfer means in said ready station, and release means therefor, said actuating means being operable by the simultaneous presence in said ready station and absence in said operating station of a transfer means to operate said release means for advance to said operating station of a transfer means in said ready station.

5. A mechanism as claimed in claim 1 wherein said transfer means are continuously powered, and said stop means includes a stop member movable into the path of a transfer means to stop the advance of said transfer means along said track means to maintain it in said station.

6. A mechanism as claimed in claim 5, wherein said track means includes a pair of electrical conductors for powering said transfer means.

7. A mechanism as claimed in claim 6 including at least one said transfer means mounted on said track means, said transfer means having a stalling motor powered from said conductors for advancing said transfer means, and removable jig means for supporting a workpiece thereon.

8. An automatic work-performing mechanism comprising support means for supporting and aligning a work piece maintained in said mechanism, tool means for performing an operation on said work piece in aligned position in said mechanism, actuating means including a resettable stepping switch and a plurality of controlling switches including a work piece sensing switch actuated by the presence of a work piece in said mechanism and a tool sensing switch actuated by completion of the operaiton of said tool means, said actuating means operable by the presence in said mechanism of said work piece to operate said support means to support and align said work piece in said mechanism, said actuating means then being operable to initiate the operation of said tool means, and release means operable by said actuating means following the operation of said tool means to release said work piece from said support means.

9. A mechanism as claimed in claim 8 wherein said actuating means is further operable to inspect a workpiece prior to initiation of said operation of said tool means, said actuating means further being operable by the presence of a defective workpiece to actuate said release means prior to said operation of said tool means.

10. A mechanism as claimed in claim 9 further including indicating means operable by said actuating means upon the presence of a defective workpiece.

References Cited in the file of this patent

UNITED STATES PATENTS

| | | |
|---|---|---|
| 967,169 | Christianson | Aug. 16, 1910 |
| 1,368,583 | Thompson | Feb. 15, 1921 |
| 1,491,182 | Andren | Apr. 22, 1924 |
| 1,999,657 | Heath | Apr. 30, 1935 |
| 2,139,403 | Cole | Dec. 6, 1938 |
| 2,238,921 | Waldsmith | Apr. 22, 1941 |
| 2,559,369 | Phillips | July 3, 1951 |
| 2,688,932 | Heil | Sept. 14, 1954 |
| 2,688,933 | Spafford | Sept. 14, 1954 |
| 2,688,934 | Quail | Sept. 14, 1954 |
| 2,745,167 | Cross | May 15, 1956 |
| 2,769,228 | Burge | Nov. 6, 1956 |
| 2,868,138 | Bishop | Jan. 13, 1959 |
| 2,902,945 | Simon | Sept. 8, 1959 |
| 2,925,787 | Rubenstein | Feb. 23, 1960 |